US007070633B2

(12) United States Patent
Okada et al.

(10) Patent No.: US 7,070,633 B2
(45) Date of Patent: Jul. 4, 2006

(54) FUEL GAS GENERATING APPARATUS FOR A FUEL CELL

(75) Inventors: Hikaru Okada, Wako (JP); Yasunori Kotani, Wako (JP); Atsushi Sakuma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 714 days.

(21) Appl. No.: 10/027,893

(22) Filed: Dec. 21, 2001

(65) Prior Publication Data

US 2002/0078628 A1    Jun. 27, 2002

(30) Foreign Application Priority Data

Dec. 22, 2000    (JP) ............................ P2000-391703

(51) Int. Cl.
*B01J 7/00*    (2006.01)
(52) U.S. Cl. ..................... 48/61; 48/127.9; 48/105; 48/107; 48/198.1; 48/215; 48/214 A; 422/188; 422/189; 422/190; 422/198; 422/211; 422/222; 422/105; 422/115
(58) Field of Classification Search .................... 48/61, 48/62 R, 127.9, 105, 198.1, 107, 198.7, 215, 48/102 R, 102 A, 93–95, 211–213, 214 A, 48/214 R; 422/188, 189, 190, 198, 211, 422/222, 105, 107–115
See application file for complete search history.

(56) References Cited

U.S. PATENT DOCUMENTS

| | | | | |
|---|---|---|---|---|
| 4,693,882 A | * | 9/1987 | Setzer et al. ................ | 423/652 |
| 6,699,609 B1 | * | 3/2004 | Kotani et al. ................. | 429/19 |
| 6,797,418 B1 | * | 9/2004 | Nomura et al. ............... | 429/13 |
| 6,833,208 B1 | * | 12/2004 | Kotani et al. ................. | 429/20 |

FOREIGN PATENT DOCUMENTS

| | | |
|---|---|---|
| JP | 01-186570 | 7/1989 |
| JP | 09-315801 | 12/1997 |
| JP | 11-260154 | 9/1999 |
| JP | 2000-053403 | 2/2000 |
| JP | 2000-128506 | 5/2000 |
| JP | 2000-154002 | 6/2000 |
| JP | 2001-226106 | 8/2001 |
| JP | 2002-025597 | 1/2002 |
| JP | 2002-170585 | 6/2002 |

OTHER PUBLICATIONS

Takagi, Yasuharu "Notice of reasons for rejection" Japanese Patent Office 2005 11 pp. (including translation).

* cited by examiner

*Primary Examiner*—Glenn Caldarola
*Assistant Examiner*—Vinit H. Patel
(74) *Attorney, Agent, or Firm*—Lahive & Cockfield, LLP; Anthony A. Laurentano, Esq.

(57) ABSTRACT

The present invention improves the start-up characteristics of a fuel gas generating apparatus for a fuel cell comprising a reformer. In a fuel gas generating apparatus 1 for a fuel cell comprising a vaporizer 22 that generates a fuel vapor by vaporizing a raw liquid fuel, a reformer 11 that generates a reforming gas that includes hydrogen from the raw fuel gas that has been partially oxidized by adding reforming air to the fuel vapor generated by the vaporizer 22, and a CO eliminator 13 that generates a fuel gas having carbon monoxide eliminated by adding a CO eliminating air to the reforming gas generated by the reformer 11, the supplied amount of the reforming air during the warm-up of the fuel gas generating apparatus for a fuel cell is larger than the supplied amount of reforming air during idle operation after completion of the warm-up.

10 Claims, 10 Drawing Sheets

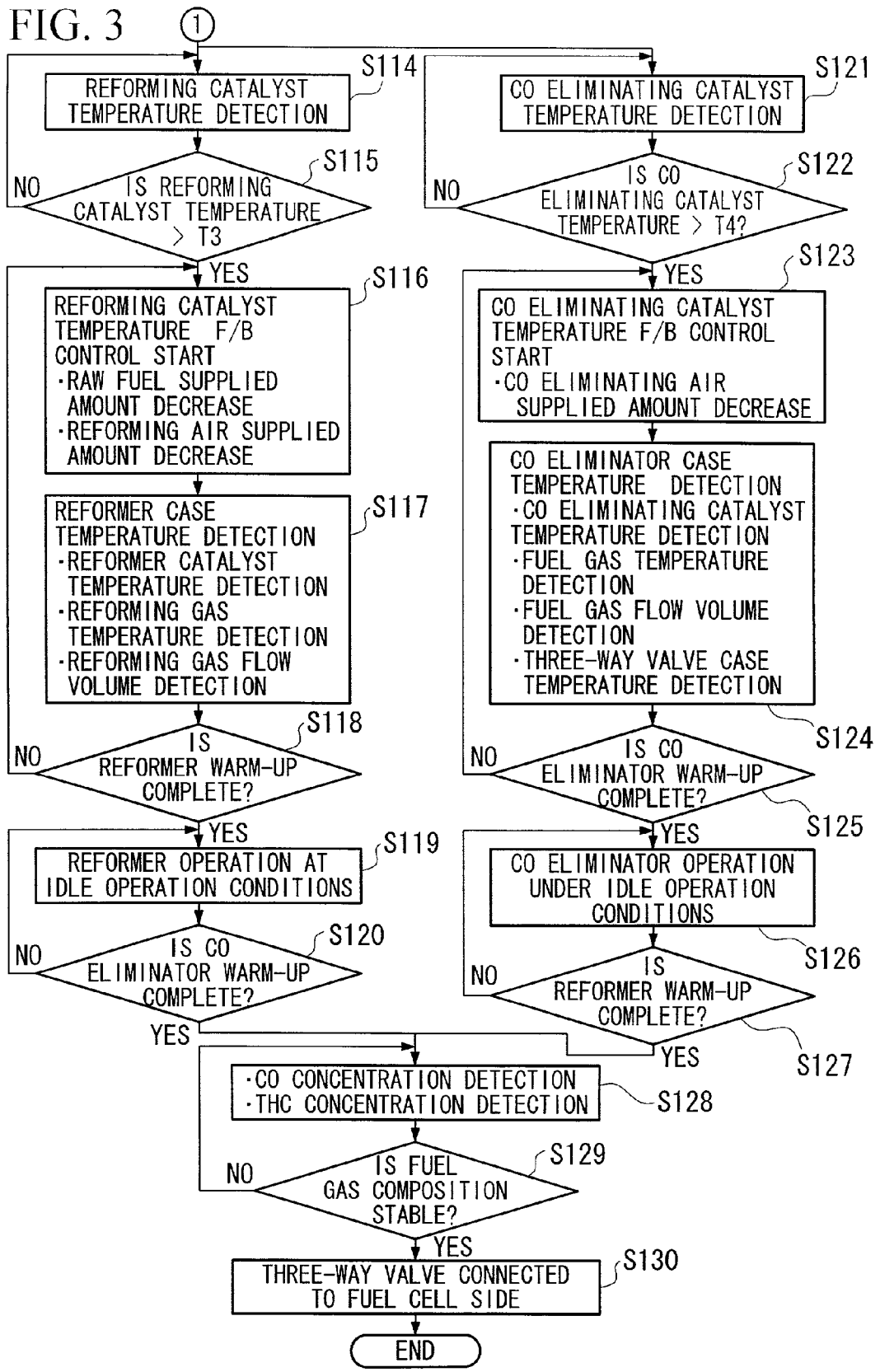

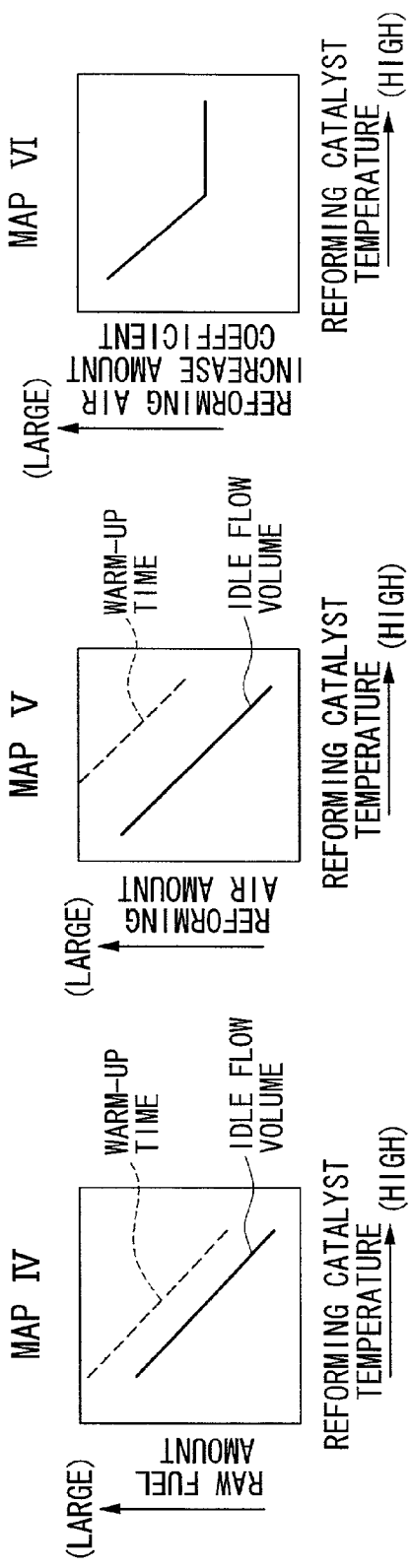
FIG. 5A MAP IV
FIG. 5B MAP V
FIG. 5C MAP VI
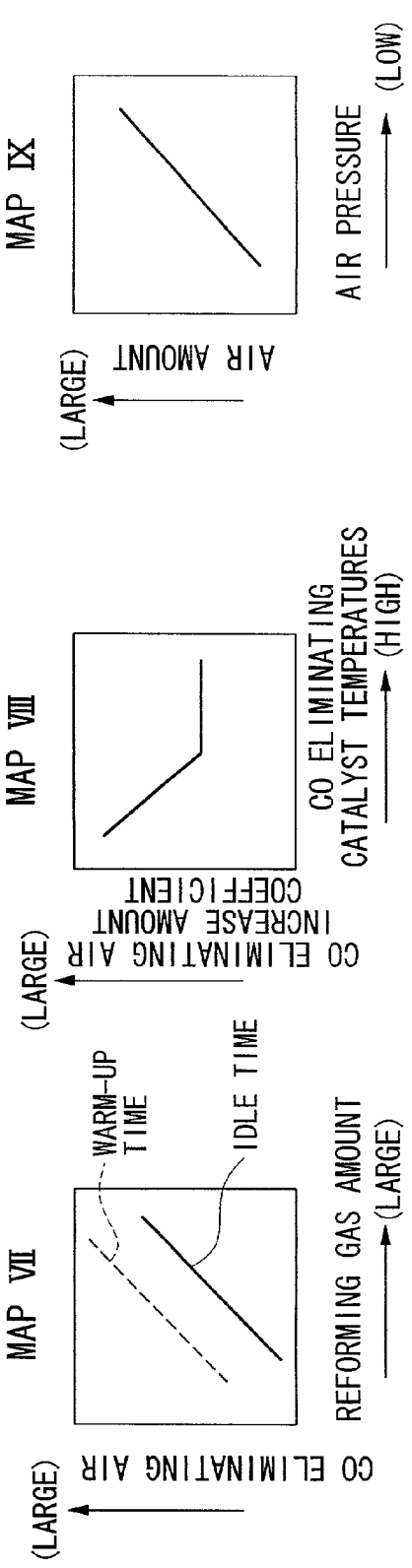
FIG. 5D MAP VII
FIG. 5E MAP VIII
FIG. 5F MAP IX

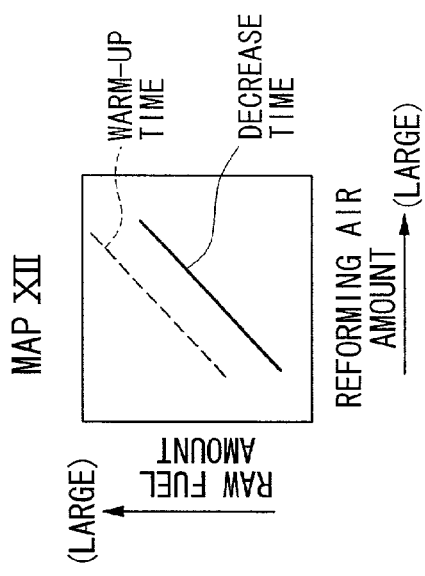
FIG. 6C MAP XII
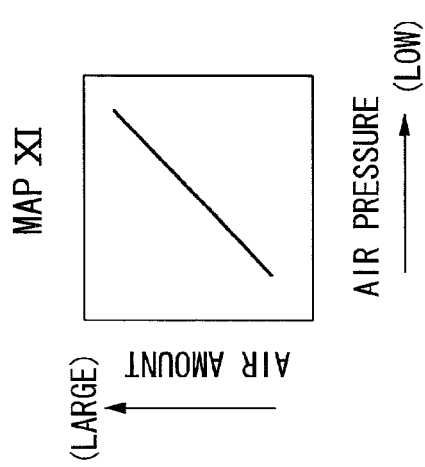
FIG. 6B MAP XI
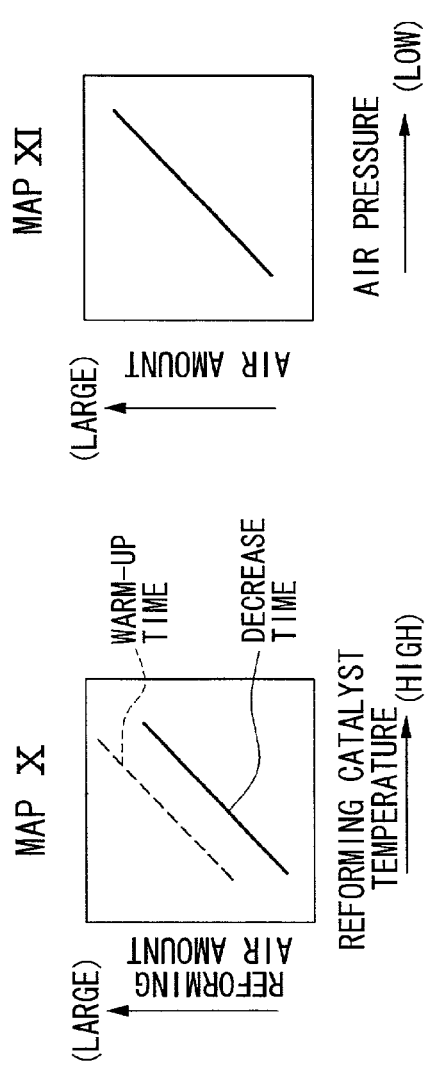
FIG. 6A MAP X

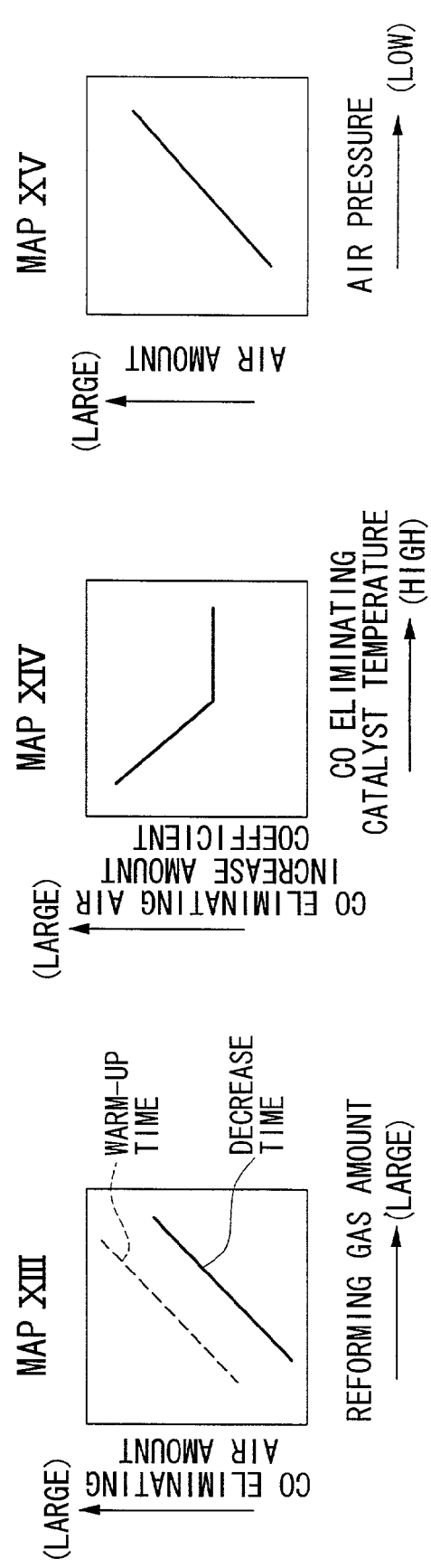
FIG. 7A MAP XIII
FIG. 7B MAP XIV
FIG. 7C MAP XV

FUEL GAS GENERATING APPARATUS FOR A FUEL CELL

BACKGROUND OF THE INVENTION

1. Field of the Invention

The present invention relates to a fuel gas generating apparatus for a fuel cell comprising a reformer that reforms a hydrocarbon fuel into a hydrogen rich gas, and in particular to a fuel gas generating apparatus for a fuel cell having superior start-up characteristics.

2. Description of the Related Art

A conventional technology is known (for example, Japanese Unexamined Patent Application, First Publication, No. 2000-154002 and Japanese Unexamined Patent Application, First Publication, No. 2000-53403) wherein a hydrocarbon fuel such as methanol or methane is reformed into a hydrogen rich fuel gas by a fuel gas generating apparatus comprising a reformer, this fuel gas and an oxidizing gas (for example, air) are supplied to a fuel cell, and electrical generation is carried out.

This fuel gas generating apparatus comprises a vaporizer that generates a fuel vapor by vaporizing a raw liquid fuel that is a mixture of a raw fuel such as methanol and water, an autothermal reformer (below, abbreviated "reformer") that generates a hydrogen rich reformed gas from a partially oxidized raw fuel gas by adding a reforming air to the fuel vapor generated by the vaporizer, a heat exchanger that lowers the temperature of the reformed gas generated by the reformer, a CO eliminator that eliminates the carbon monoxide in the reformed gas by adding CO eliminating air to the reformed gas whose temperature has been lowered by the heat exchanger and generates a fuel gas, and a fuel cell that generates electricity by an electrochemical reaction between the fuel gas supplied to an anode electrode and the air (oxidizing gas) supplied to the cathode electrode.

In this fuel gas generating apparatus, the system as a whole must be warmed up until the gas composition of the fuel gas after start-up stabilizes and the fuel gas temperature stabilizes at a temperature that allows supplying the fuel gas to the fuel cell.

In the conventional warm-up method, for example, a start-up burner is installed in the reformer, a heater is provided on the reformer, a heat medium (for example, air) that has been heated by the heater is allowed to flow to the heat exchanger and the CO eliminator. First, cooling water for the heat exchanger and cooling water for catalytic temperature adjustment of the CO eliminator are warmed up by supplying external heat using these heat sources, the catalyst in the reformer and the catalyst in the CO eliminator are warmed up to a temperature equal to or greater than the active temperature, the system is warmed up to a temperature equal to or greater than the fuel gas dew point temperature, and at the same time, the vaporizer is warmed up. After the warm-up of the vaporizer has completed, both the fuel vapor generated in the vaporizer and the reforming air are supplied to the reformer in the amount supplied during the idling operation after warm-up is completed, the reforming reaction is started, the warm-up is carried out starting from the reformer, which is in the front end, and the warm-up progresses gradually towards the back end.

However, in this warm-up method, a long time passes until the catalyst of the CO eliminator in the back end reaches the activation temperature, and in addition, a long time passes in warming up the cooling water for temperature adjustment of the catalyst in the CO eliminator and the internal system path, and as a result the warm-up of the system as a whole may require tens of minutes, and subsequently several minutes are required for the composition of the fuel gas to stabilize.

In the case of being employed in an industrial field requiring a fast start-up, and in particular, in fuel cell vehicles, in order to make driving possible until the composition of the fuel gas stabilizes, a large-capacity storage battery must be installed, and thus there is the problem that the system becomes large.

Thus, it is an object of the present invention to provide a fuel gas generating apparatus for a fuel cell that makes possible the fast warm-up of the reformer, CO eliminator, system gas path, and the like, and makes possible the fast stabilization of the fuel gas composition.

SUMMARY OF THE INVENTION

In order to solve the above-described problems, a first aspect of the invention is characterized in comprising a fuel gas generating apparatus for a fuel cell (for example, the fuel gas generating apparatus 1 in the embodiment described below) comprising a vaporizer (for example, the vaporizer 22 in the embodiment described below) that generates a fuel vapor by vaporizing a raw liquid fuel, an autothermal reformer (for example, the reformer 11 in the embodiment described below) that generates a reforming gas that includes hydrogen from the raw fuel gas that has been partially oxidized by adding reforming air to the fuel vapor generated by the vaporizer, and a CO eliminator (for example, the CO eliminator 13 in the embodiment described below) that generates a fuel gas having carbon monoxide eliminated by adding a CO eliminating air to the reforming gas generated by the autothermal reformer, comprising: a reforming air amount control device that controls the supplied amount of the reforming air during the warm-up of the reformer so as to become larger than the supplied amount of reforming air during the idle operation after completion of the warm-up.

Due to having this type of structure, oxygen in the air supplied in excess to the reformer during warm-up facilitates the combustion by a catalyst inside the reformer, and this combustion heat heats the reformer and the reforming gas. In addition, the CO eliminator and the gas path in the system are heated by the heated reforming gas flowing downstream.

A second aspect of the present invention is characterized in comprising a fuel amount control device that controls the supplied amount of the raw liquid fuel during the warm-up of the reformer so as to become larger than the supplied amount of raw liquid fuel during idle operation after completion of the warm-up.

Due to having this type of structure, the amount of heat generation in the reformer during warm-up is increased further, and at the same time the amounts of hydrogen, CO, and unreacted hydrocarbons flowing out from the reformer during warm-up is increased.

A third aspect of the present invention is characterized in that the ratio of the increased supplied amount of reformed air controlled by the reforming air amount control device is set larger than the ratio of the increased supplied amount of raw liquid fuel controlled by the fuel amount control device. Due to having this type of structure, the amount of oxygen that allows combustion in the catalyst in the reformer can be guaranteed.

A fourth aspect of the present invention is characterized in that the temperature corresponding to the warm-up state of the reformer is detected, and when this detected temperature has become higher than a predetermined temperature, the supplied amount of reforming air that is increased by the reforming air amount control device during the warm-up of the reformer is then decreased. Due to having this type of structure, the overheating of the catalyst in the reformer can be prevented.

A fifth aspect of the present invention is characterized in that the control for decreasing the supplied amount of the reforming air is decreased depending on the detected temperature. Due to having this type of structure, the warm-up state of the reformer can be gradually stabilized.

A sixth and seventh aspect of the present invention is characterized in that the detected temperature is at least one among the temperature of the catalyst in the reformer, the temperature of the reforming gas, or the temperature of the case of the reformer. Due to having this type of structure, when the reformer has been warmed-up as required, the supplied amount of reforming air that has been increased by compensation can be controlled so as to be reduced, and the overheating of the catalyst in the reformer can be reliably prevented. Moreover, because there is "at least one", any one among the temperature of the catalyst in the reformer, the temperature of the reforming gas, or the temperature of the case of the reformer can be used, or the one among these temperatures that is the lowest can be used, or the one among these that is the highest can be used.

An eighth aspect of the present invention is characterized in comprising a fuel gas generating apparatus for a fuel cell (for example, the fuel gas generating apparatus 1 in the embodiment described below) comprising a vaporizer (for example, the vaporizer 22 in the embodiment described below) that generates a fuel vapor by vaporizing a raw liquid fuel, an autothermal reformer (for example, the reformer 11 in the embodiment described below) that generates a reforming gas that includes hydrogen from the raw fuel gas that has been partially oxidized by adding reforming air to the fuel vapor generated by the vaporizer, and a CO eliminator (the CO eliminator 13 in the embodiment described below) that generates a fuel gas having carbon monoxide eliminated by adding a CO eliminating air to the reforming gas generated by the autothermal reformer, comprising: a CO eliminating air amount control device that controls the supplied amount of CO eliminating air during the warm-up of the CO eliminator so as to become larger than the supplied amount of CO eliminating air during the idle operation after completion of the warm-up.

Due to having this type of structure, the hydrogen, the carbon monoxide, and the unreacted hydrocarbons flowing out from the reformer during warm-up are sufficiently combusted by the catalyst in the CO eliminator, owing to with the oxygen in the CO eliminating air that is supplied in excess, and the CO eliminator can be heated by this combustion heat. Furthermore, the gas path in the system can be heated due to this combustion gas flowing downstream.

An ninth aspect of the present invention is characterized in that the autothermal reformer and CO eliminator supply the fuel gas to the fuel cell after it has been determined that the warm-up has completed. Due to having this type of structure, a fuel gas that has been controlled so as to obtain a predetermined gas composition and gas temperature can be supplied to the fuel cell.

BRIEF DESCRIPTION OF THE DRAWINGS

FIG. 3 is a flowchart (two of two) of the warm-up processing for the fuel gas generating apparatus.

FIGS. 5A to 5F are maps for calculating the initially supplied amounts of raw fuel, reforming air, and CO eliminating air in the fuel gas generating apparatus.

FIGS. 6A to 6C are maps for calculating the supplied amount of raw fuel and reforming air when carrying out F/B (feedback) control of the reforming catalyst temperature in the fuel gas generating apparatus.

FIGS. 7A to 7C are maps for calculating the supplied amount of CO eliminating air when carrying out F/B (feedback) control of the CO eliminating catalyst temperature in the fuel gas generating apparatus.

DETAILED DESCRIPTION OF THE INVENTION

Below, an embodiment of the gas fuel generating apparatus for a fuel cell according to the present invention will be explained while referring to FIG. 1 through FIG. 11. Moreover, the embodiment explained below is a form of the fuel gas generating apparatus for a fuel cell that is mounted in a fuel cell vehicle.

Figure 1:
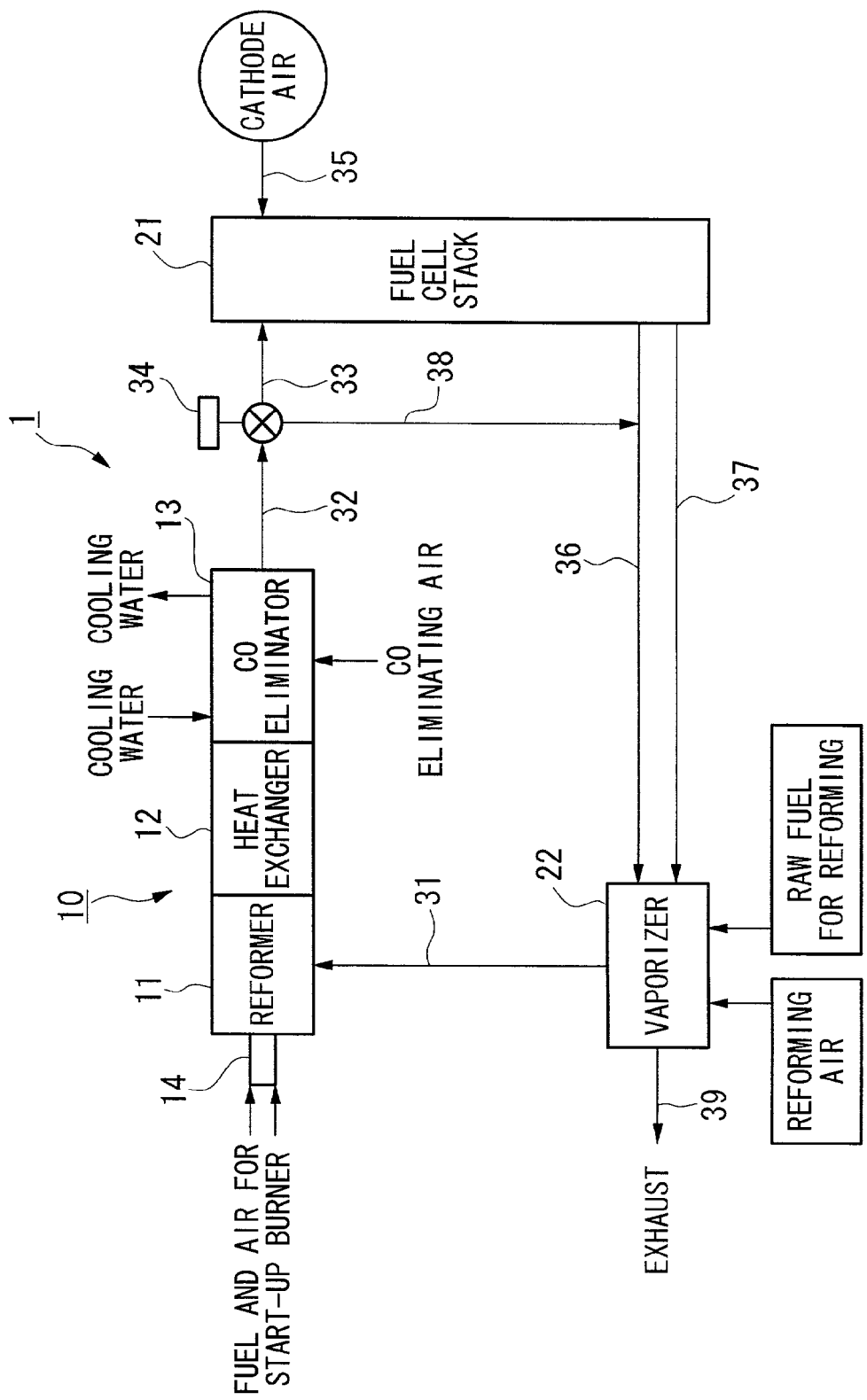
FIG. 1 is a drawing showing the schematic structure of the first embodiment of the fuel gas generating apparatus for a fuel cell according to the present invention.

FIG. 1 is a schematic drawing of the fuel gas generating apparatus for a fuel cell (below, abbreviated "fuel gas generating apparatus"), and the fuel gas generating apparatus 1 provides a reforming reactor 10, a fuel cell stack (fuel cell) 21, and a vaporizer 22 as essential elements, and the reforming reactor 10 provides a reformer 11, a heat exchanger 12, a CO eliminator 13, and a start-up burner 14.

The fuel cell stack 21 is a solid polymer-type fuel cell, and generates electricity by causing an electrochemical reaction between the hydrogen in the fuel gas supplied to the anode electrode and the oxygen in the air, which serves as an oxidizing agent, supplied to the cathode cell.

The fuel gas supplied to the anode electrode of the fuel cell stack 21 that is used is a raw liquid fuel that has been vaporized by a vaporizer 22, and then reformed into a hydrogen rich fuel gas by a reforming reactor 10.

Furthermore, the raw liquid fuel for reforming, which comprises a hydrocarbon fuel (for example, methanol) and water mixed at a predetermined ratio, and the air for reforming (below, referred to as the "reforming air") are supplied to the vaporizer 22; the raw liquid fuel and the reforming air in the vaporizer 22 are heated; and the raw liquid fuel becomes fuel vapor by being vaporized and is supplied to the reformer 11 of the reforming reactor 10 via the fuel supply duct 31 from the vaporizer 22 in a state mixed with the heated reforming air.

The reformer 11 of the reforming reactor 10 is an autothermal reformer provided with a palladium (Pd)-type precious metal catalyst that serves as the reforming catalyst inside, and generates a hydrogen rich reformed gas from the raw fuel gas, which is the fuel vapor generated in the vaporizer 22 that has been partially oxidized by the reforming air. After the reformed gas generated by the reformer 11 has been cooled by the heat exchanger 12, it is supplied to the CO eliminator 13. The CO eliminator 13 provides a platinum (Pt)-type catalyst that is active at low temperatures, and in addition, the air for CO elimination (below, referred to the CO eliminating air) can be supplied, and in the CO eliminator 13, the CO in the reformed gas is oxidized to become $CO_2$, that is, the fuel gas is generated by eliminating the CO in the reformed gas. In addition, in the CO eliminator 13, cooling water for cooling the fuel gas can be conveyed. Raw liquid fuel and air can be supplied to the start-up burner 14, and only during the warm-up, the raw fuel and air are supplied to the burner 14 and ignited.

The fuel gas reformed by the reforming reactor 10 is supplied to the anode electrode of the fuel cell stack 21 via a fuel gas supply ducts 32 and 33 and a three-way selector valve 34. Air can be supplied as an oxidizing agent to the cathode electrode of the fuel cell stack 21 from a supercharger (not illustrated) via the air supply duct 35.

After the fuel gas supplied to the anode electrode of the fuel cell stack 21 has been provided for power generation, it is supplied to the vaporizer 22 via the fuel off gas pipe 36 as fuel off gas, and in addition, after the air supplied to the cathode electrode has been provided for power generation, it is supplied to the vaporizer 22 via the air off gas pipe 37 as air off gas. In addition, the three-way selector valve 34 is connected to the fuel off gas pipe 36 by a bypass pipe 38 that bypasses the fuel cell stack 21, and the three-way selector valve 34 can selectively connect the fuel gas supply duct 32 to either the fuel gas supply duct 33 or the bypass pipe 38. When the three-way selector valve 34 connects the fuel gas supply duct 32 and the fuel gas supply duct 33, the fuel gas flowing out from the reforming reactor 10 is supplied to the fuel cell stack 21, and when the three-way selector valve 34 connects the fuel gas supply duct 33 and the bypass pipe 38, the fuel gas flowing out from the reforming reactor 10 bypasses the fuel cell stack 21 and flows through the bypass pipe 38.

The fuel off gas and the air off gas discharged from the fuel cell stack 21 are introduced into the catalytic combustor built into the vaporizer 22, are combusted in the catalytic combustor, and the raw liquid fuel for reforming and the reforming air supplied to the vaporizer 22 are heated by this combustion heat. Moreover, in the vaporizer 22, the fuel off gas and the air off gas that serve as the heat source in the vaporizer 22 are discharged to the atmosphere via the discharge pipe 39.

Next, the operation of the fuel gas generating apparatus 1 will be explained. In this fuel gas generating apparatus 1, in order to obtain a fast warm-up, the supplied amounts of raw liquid fuel, reforming air, and CO eliminating air during the warm-up are made larger than each of the supplied amounts after completion of the warm-up. Moreover, the amount of the raw fuel has a proportional relationship to the amount of the reformed gas and the amount of the fuel gas.

However, the warm-up is carried out when the internal temperature during start-up, for example, is low, and is not carried out during restarting or the like when the interior is sufficiently warm.

During the warm-up of the fuel gas generating apparatus 1 (that is, during the warm-up of the reformer 11), when excess reforming air is supplied to the reformer 11 by increasing the supplied amount of reforming air, the oxygen in the excessively supplied air is combusted by the reforming catalyst, and this combustion heat heats the case of the reformer 11, the reforming catalyst, and the reformed gas. Thereby, the warm-up of the reformer 11 is promoted.

In addition, during warm-up of the fuel gas generating apparatus 1 (that is, during the warm-up of the reformer 11), when excess fuel vapor is supplied to the reformer 11 by increasing the supplied amount of raw liquid fuel, the fuel vapor combusted in the reformer 11 also increases, and thus the amount of generated heat in the reformer 11 increases, and thereby the warm-up of the reformer 11 is promoted.

Furthermore, due to the reformed gas quickly heated in this manner flowing downstream, the CO eliminator and the gas path are also heated, and thus their warm-up is also promoted.

In addition, during the warm-up of the fuel gas generating apparatus 1, not only hydrogen and carbon monoxide flow out or the reformer 11, but there are also large amounts of unreacted hydrocarbons. However, when the amount supplied to the CO eliminator during the warm-up of the fuel gas generating apparatus 1 (that is, during the warm-up of the CO eliminator 13) is increased, the hydrogen, carbon monoxide, and unreacted hydrocarbons can be sufficiently combusted in the CO eliminating catalyst, and this combustion heat heats the case of the CO eliminator 13, the CO eliminating catalyst, and the fuel gas. Thereby, the warming-up of the CO eliminator 13 is promoted. Furthermore, the fuel gas that has been quickly heated flows downstream, and thereby the gas path downstream is heated. Thus, the warm-up of the internal gas path is also promoted.

As a result, the quick warm-up of the fuel gas generating apparatus 1 becomes possible, and the quick stabilization of the composition of the fuel gas generated by the reforming reactor 10 is attained, and the fuel cell stack 21 can be quickly brought into a state in which power generation is possible.

Figure 2:
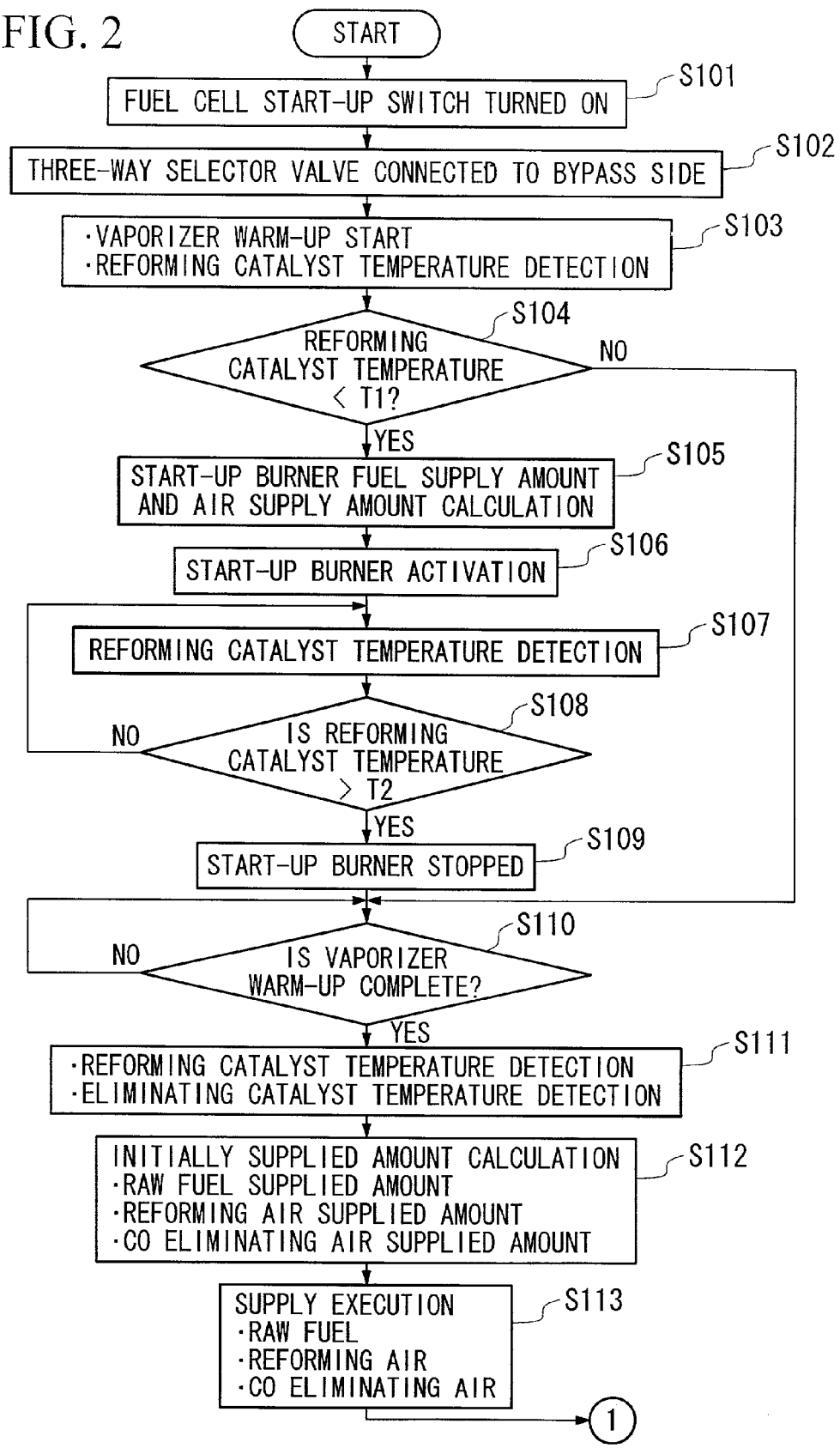
FIG. 2 is a flowchart (one of two) of the warm-up processing for the fuel gas generating apparatus.
Figure 4A:
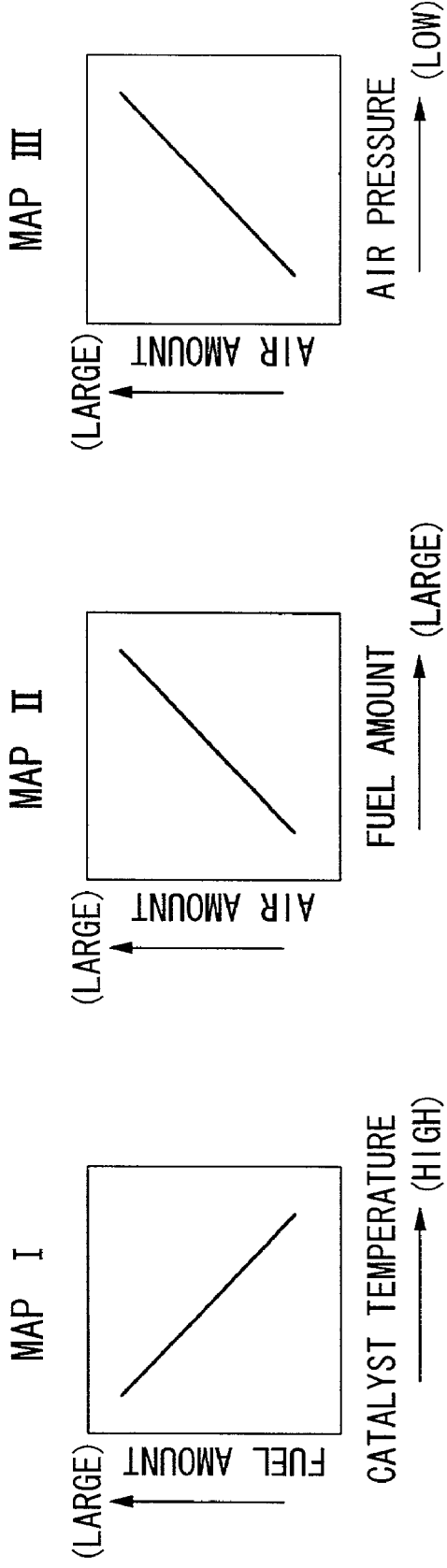
FIGS. 4A to 4C are maps for calculating the amount of fuel and the amount of air supplied to the start-up burner in the fuel gas generating apparatus.
Figure 4B:
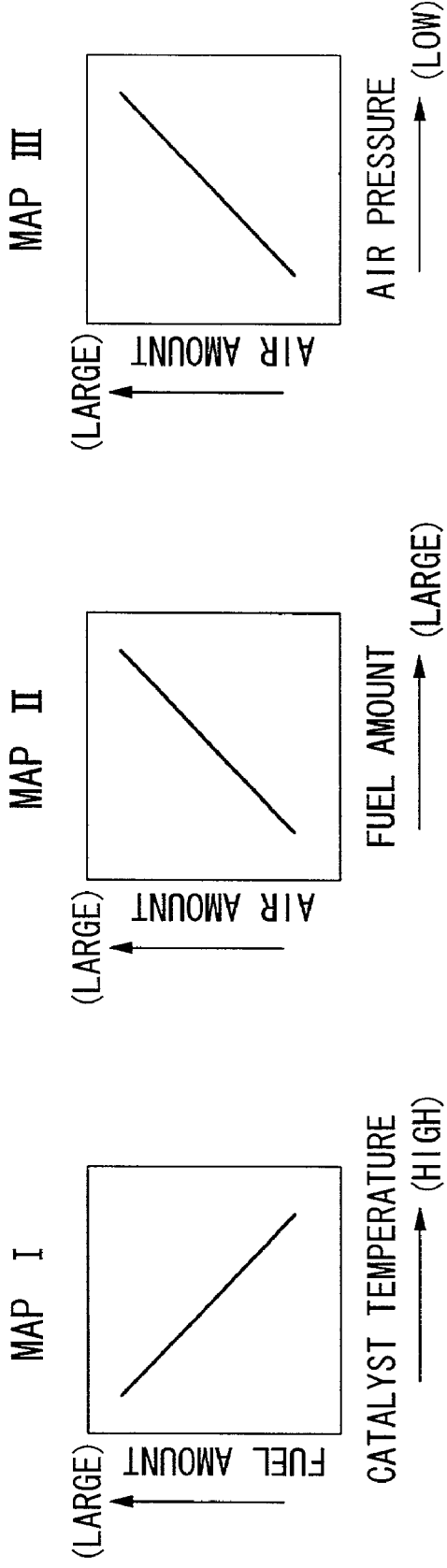
Figure 4C:
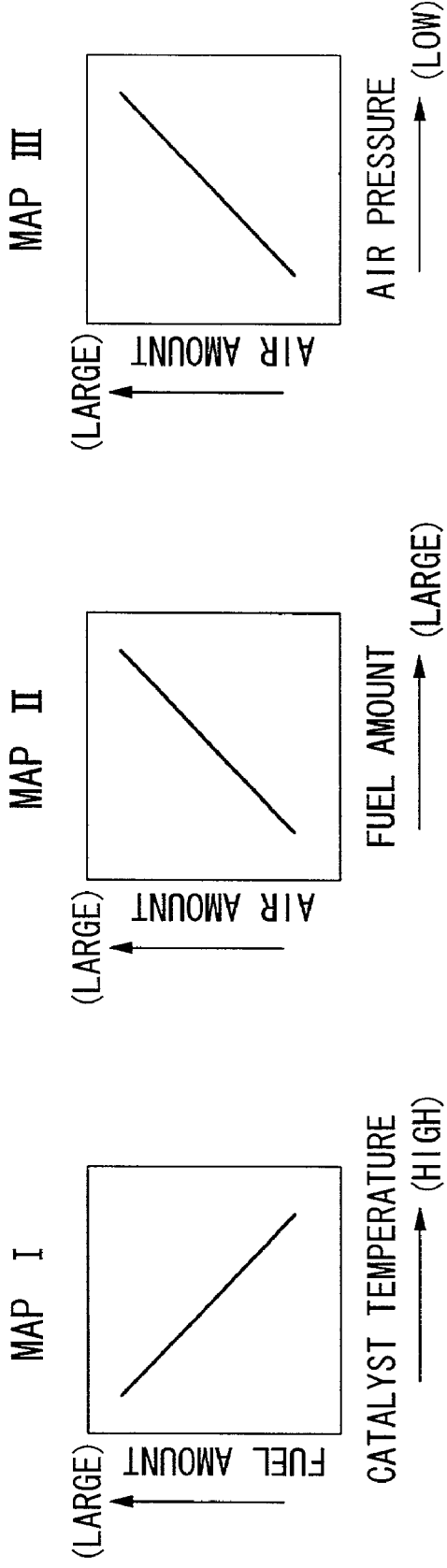

Next, the warm-up processing sequence during the warm-up of the fuel gas generating apparatus 1 in the present embodiment will be explained while referring to FIG. 2 and the flowchart in FIG. 3. Moreover, this flowchart shows the processing sequence, and does not show the flow of electrical signals.

First, when the fuel cell start-up switch is turned ON (step S 101), the flow proceeds to step S 102, and the three-way selector valve 34 is switched so that the fuel gas supply duct 32 and the bypass duct 38 are connected.

Secondly, the flow proceeds to step S 103, the warm-up of the vaporizer 22 starts, and at the same time the reforming catalyst temperature (detected temperature) of the reformer 11 is detected. Then the flow proceeds to step S 104, and it is determined whether or not the reforming catalyst temperature is lower than the threshold value T1. In the case that the determination in step S 104 is positive, that is, in the case that the reforming catalyst temperature is lower than the threshold value T1, the pre-warm-up of the reforming catalyst is necessary, so the flow proceeds to step S 105. In the case that the determination in step S 104 is negative, the pre-warm-up of the reforming catalyst is unnecessary, and the flow proceeds to step S 110.

In step S 105, the supplied amount of the raw liquid fuel and air to be supplied to the start-up burner 14 is calculated. That is, based on the reforming catalyst temperature detected in step S 103, the necessary amount of fuel is calculated by referring to the map I shown in FIG. 4A, and the amount of air necessary to combust this amount of fuel is calculated by referring to map II shown in FIG. 4B, and finally the pressure of this amount of air is compensated by referring to the map III shown in FIG. 4C. The compensation of the pressure of the amount of air is because that is actually necessary is not the amount of air but the amount of oxygen.

Next, the flow proceeds to step S 106, the amount of fuel and the amount of air calculated in step S 105 are supplied to the start-up burner 14, ignition is carried out, and the start-up burner 14 is started. Thereby, the pre-warm-up of the reforming catalyst of the reformer 11 is started.

Next, the flow proceeds to step S 107, the reforming catalyst temperature of the reformer 11 is detected, and in step S 108 it is determined whether or not the reforming catalyst temperature is equal to or greater than a threshold value T2. In the case that the threshold value T2 is set to a temperature that is higher than the threshold value T1 and the determination in step S 108 is negative, the pre-warm-up of the reforming catalyst is still insufficient, and thus the pre-warm-up of the start-up burner 14 is continued.

In the case that the determination in step S 108 is negative, the flow proceeds to step S 109, the start-up burner 14 is stopped, and the pre-warm-up is completed. The flow then proceeds to step S 110, and it is determined whether or not the warm-up of the vaporizer 22 has completed. In the case that the determination in step S 110 is negative, the warm-up of the vaporizer 22 is continued.

In the case that the determination in step S 110 is negative, the flow proceeds to step S 111, the reforming catalyst temperature of the reformer 11 and the CO eliminating catalyst temperature of the CO eliminator 13 are detected, then the flow proceeds to step S 112, and the initially supplied amounts of raw liquid fuel and reforming air to be supplied to the vaporizer 22 and the initial supplied amount of the CO elimination air to be supplied to the CO eliminator 13 are calculated.

In more detail, first, based on the reforming catalyst temperature detected in step S 111, the initial supplied amount of necessary raw fuel is calculated by referring to map IV shown in FIG. 5A. In map IV, the solid line is used when calculating the amount of raw fuel during the idle operation, the broken line is used when calculating the initially supplied amount, and when the reforming catalyst temperature is compared for similar cases, the initially supplied amount is set so as to be larger than the amount supplied during the idle operation. Here, idle operation denotes the minimum operational state for maintaining the temperature of the fuel gas generating apparatus 1.

Next, based on the reforming catalyst temperature, the reforming air amount is calculated by referring to the map V shown in FIG. 5B. In map V, the solid line is used when calculating the reforming air amount during idle operation, the broken line is used when calculating the reforming air amount at the beginning of the warm-up, and when the reforming catalyst temperature is compared for similar cases, the supplied amount at the beginning of the warm-up is set so as to be larger than the amount supplied during the idle operation.

Next, the reforming air increased amount coefficient that depends on the reforming catalyst temperature is calculated by referring to the map VI shown in FIG. 5C, and the initially supplied amount of the reforming air is calculated by multiplying the reforming air amount calculated using map V by the increase coefficient calculated using map VI.

Then the pressure of the initially supplied amount of reforming air is compensated by referring to the map IX shown in FIG. 5F.

Moreover, the increase ratio of the initially supplied amount of the reforming air at the beginning of the warm-up is set to less than five times the supplied amount of the reforming air during idle operation.

In addition, the increased ratio of the initially supplied amount of reforming air at the beginning of the warm-up with respect to the supplied amount of reforming air during idle operation is set so as to be larger than the increased ratio of the initially supplied amount of raw fuel at the beginning of the warm-up with respect to the supplied amount of raw fuel during idle operation. For example, the initially supplied amount of raw fuel may be twice the supplied amount of raw fuel during idle operation, and the initially supplied amount of reforming air may be three times the supplied amount of reforming air during idle operation.

Next, the amount of CO eliminating air for the initial reforming gas amount is calculated by referring to the map VII in FIG. 5D. In map VII, the solid line is used when calculating the CO eliminating air amount during idle operation, and the broken line is used when calculating the CO eliminating air amount at the beginning of the warm-up, and when the reforming gas amount is compared for similar cases, the supplied amount at the beginning of the warm-up is set so as to be larger than the amount supplied during the idle operation.

Next, the CO eliminating air increase amount coefficient that depends on the temperature of the CO eliminating catalyst detected in step S 111 is calculated by referring to the map VIII shown in FIG. 5E, and the initially supplied amount of CO eliminating air is calculated by multiplying the CO eliminating air amount calculated using map VII by the increase coefficient calculated using map VIII. Furthermore, the pressure of the initially supplied amount of CO eliminating air is compensated by referring to the map IX shown in FIG. 5F.

The reason for compensating the pressure of the initially supplied amounts of reforming air and CO eliminating air is that what is actually necessary is not the amount of air, but the amount of oxygen.

Next, the flow proceeds to step S 113, the raw fuel and reforming air for the initially supplied amounts that have been calculated in step S 112 are supplied to the vaporizer 22, and at the same time, the CO eliminating air for the initially supplied amount that has been calculated in step S 112 is supplied to the CO eliminator 13.

In this manner, by making the initially supplied amount of reforming air larger than the amount supplied the during idle operation, the oxygen in the reforming air supplied in excess is combusted by the reforming catalyst, and this combustion heat heats the case of the reformer 11, the reforming catalyst, and the reforming gas. As a result, the reformer 11 can be warmed up quickly. In addition, the reforming gas heated in this manner flows downstream, and thereby the case of the heat exchanger 12, the cooling water, and case of the CO eliminator 13, the CO eliminating catalyst, and the gas paths in the system are heated.

In addition, by making the initially supplied amount of raw fuel larger than the amount supplied during the idle operation, the amount of heat generation in the reformer 11 increases, and thus the warm-up of the reformer 11 becomes even faster, and the warm-up of each device disposed father downstream from the reformer 11 becomes even faster. In addition, the amount of hydrogen, CO, and unreacted hydrocarbons that flow out from the reformer 11 can be increased.

In addition, because the increased proportion of the initially supplied amount of reforming air at the beginning of the warm-up with respect to the supplied amount of reforming air during idle operation is set larger than the increased proportion of the initially supplied amount of raw fuel at the beginning of the warm-up with respect to the supplied amount of raw fuel during idle operation, the quick warm-up due to the increase in the supplied amount of raw fuel and the quick warm-up due to the increase in the supplied amount of reforming air can both be made effective.

In addition, by making the initially supplied amount of CO eliminating air larger than the amount supplied during the operation, the hydrogen, carbon monoxide, and unreacted hydrocarbons flowing from the reformer 11, in addition to the oxygen in the CO eliminating air that has been supplied in excess, can be sufficiently combusted by the CO eliminating catalyst, and this combustion heat can heat the case of the CO eliminator 13, the CO eliminating catalyst, and cooling water for adjusting the CO eliminating catalyst temperature. As a result, the CO eliminator 13 can be quickly warmed up.

Furthermore, this combustion gas flowing downstream can heat the gas path in the system. Therefore, the warm-up of the gas paths in the system becomes quick.

Next, the flow proceeds from step S 113 to step S 114 and step S 121.

When the flow proceeds to step S 114, which is the processing line of the reformer 11, in step S 114 the reforming catalyst temperature of the reformer 11 is detected, and then the flow proceeds to step S 115, and it is determined whether or not the reforming catalyst temperature is larger than the threshold value T3. Here, the threshold value T3 is set equal to or larger than the regenerating temperature of the reforming catalyst in advance. In the case of a negative determination in step S 115, that is, in the case that the reforming catalyst temperature is lower than the threshold value T3, the amounts of the raw fuel and the reforming air supplied to the vaporizer 22 are maintained at the initially supplied amounts, and the operation of the vaporizer 22 and the reformer 11 continues. Moreover, the regeneration temperature is the temperature at which the deterioration of the catalyst is temporarily repressed, and in addition, the temperature at which the capacity of the catalyst is slightly increased, and differs depending on the catalyst.

In the case that the determination in step S 115 is negative, that is, in the case that the reforming catalyst temperature is higher than the threshold value T3, the target temperature of the reforming catalyst is set to the target temperature during idle operation, and feedback control (below, abbreviated "F/B control") of the reforming catalyst temperature starts. Moreover, the target temperature of the reforming catalyst during idle is lower than the threshold value T3.

In this manner, due to the reforming catalyst temperature once being equal or greater than the regeneration temperature, the reforming catalyst can be regenerated.

The detailed explanation of the F/B control of the reforming catalyst temperature is as follows. The reforming air amount is calculated by referring to the map X in FIG. 6A based on the reforming catalyst temperature. In the map X, the solid line is used when calculating the reforming air amount during the F/B control of the reforming catalyst temperature, the broken line is used when calculating the reforming air amount at the beginning of the warm-up described above, and when comparing the reforming catalyst temperature for similar cases, the amount supplied during this F/B control is set so as to be smaller than the supplied amount at the beginning of the warm-up. That is, in this F/B control, control is carried out such that the reforming air amount decreases.

Next, the pressure of the reforming air amount calculated using the map X is compensated by referring to the map XI in FIG. 6B, and then based on the reforming air amount whose pressure has been compensated, the raw fuel amount is calculated by referring to the map XII shown in FIG. 6C. In the map XII, the solid line is used when calculating the raw fuel amount during the F/B control of the reforming catalyst temperature, the broken line is used when calculating the raw fuel amount at the beginning of the warm-up described above, and when comparing the reforming air amount for similar cases, the supplied amount at the beginning of the warm-up is set so as to be larger than the amount supplied during F/B control. That is, in this F/B control, control is carried out so that the raw fuel amount decreases.

In addition, the supply of the raw fuel and the reforming air to the vaporizer 22 is executed using the supplied amounts calculated in this manner. Thereby, the reforming catalyst temperature converges on the target temperature during the idle time by gradually decreasing, and as a result, the deterioration of the reforming catalyst due to needless exposure to high temperatures can be prevented.

Next, the flow proceeds to step S 117, and the temperature of the case of the reformer 11, the reforming catalyst temperature, the reforming gas temperature, and the reforming flow volume are detected. Next, the flow proceeds to step S 118, and based on each of the detected values that have been detected in step S 117, it is determined whether or not the warm-up of the reformer 11 has been completed. That is, it is determined whether or not the temperature of the case of the reformer 11, the reforming catalyst temperature, the reforming gas temperature, and the reforming gas flow volume detected in step S 117 fall within a set range during idle operation (below, referred to as the "idle setting range") that is set in advance for each of the detected items. If all of these detected values fall within the idle setting range, it is determined that the warm-up of the reformer 11 has completed, and if even one among the detected values falls outside the set range, it is determined that the warm-up is not yet complete. In this manner, the completion of the warm-up of the reformer is determined based on a plurality of detested values, and thus the determination of the completion of the warm-up can be carried out accurately.

In the case that the determination in step S 118 is negative, the flow returns to step S 116, and the F/B control of the reforming catalyst temperature is continued. In the case that the determination in step S 118 is positive, the flow proceeds to step S 119, and the vaporizer 22 and the reformer 11 are operated under idle operation conditions. Then the flow proceeds to step S 120, and it is determined whether or not the warm-up of the CO eliminator 13 has completed. In the case that the determination in step S 120 is negative, the flow returns to step S 119, and the operation of the vaporizer 22 and the reformer 11 is continued under idle operation conditions.

The flow proceeds from step S 113 to step S 121, which is the processing line of the CO eliminator 13, the CO eliminating catalyst temperature of the CO eliminator 13 is detected in step S 121, and then the flow proceeds to step S 122, and it is determined whether or not the CO eliminating catalyst temperature is larger than a threshold value T4. Here, preferably the threshold value T4 is set in advance equal to or greater than the regeneration temperature of the CO eliminating catalyst. In the case that the determination in step S 122 is negative, that is, in the case that the CO eliminating catalyst temperature is lower than the threshold value T4, the amount of CO eliminating air supplied to the CO eliminator 13 is maintained at the initially supplied amount and the operation of the CO eliminator 13 is continued.

In this manner, by once raising the CO eliminating catalyst temperature so as to be equal to or greater than the regeneration temperature, the CO eliminating catalyst can be regenerated, and the service-life of the catalyst is extended.

In contrast, in the case that the determination in step S 122 is negative, that is, in the case that the CO eliminating catalyst temperature is greater than the threshold value T4, the target temperature of the CO eliminating catalyst is set to the target temperature during idle operation, and the F/B control of the CO elimination catalyst temperature is started. Moreover, the target temperature of the CO eliminating catalyst during idle operation is lower than the threshold value T4.

The F/B control of the CO eliminating catalyst temperature will now be explained in detail. First, the CO eliminating air amount is calculated by referring to the map XIII shown in FIG. 7A, based on the reforming gas amount. Moreover, the map XIII is substantially identical to map VII in FIG. 5D. In map XIII, the solid line is used when calculating the CO eliminating air amount during F/B control of the CO eliminating catalyst temperature, the broken line is used when calculating the CO eliminating air amount at the beginning of the warm-up described below, and when the reforming gas amount is compared for similar cases, the amount supplied during this F/B control is set so as to be smaller than the amount supplied at the beginning of the warm-up. That is, in this F/B control, the control is carried out so that the CO eliminating air amount is decreased.

Next, the CO eliminating air increase amount coefficient is calculated by referring to the map XIV shown in FIG. 7B based on the CO eliminating catalyst temperature, and the CO eliminating air amount is calculated by incrementing CO eliminating air amount calculated using map XIII by the increase amount coefficient calculated using map XIV. Furthermore, the pressure of this CO eliminating air amount is compensated by referring to map XV shown in FIG. 7C.

In addition, the supply of the CO eliminating air to the CO eliminator 13 is executed using the supplied amount calculated in this manner. Thereby, the CO eliminating catalyst temperature converges on the target temperature during idle operation by gradually falling, and as a result, the deterioration of the CO eliminating catalyst due to needless exposure to high temperature can be prevented. In addition, at the same time the CO eliminating air amount supplied to the CO eliminator 13 decreases.

Next, the flow proceeds to step S 124, and the case temperature of the CO eliminator 13, the CO eliminating catalyst temperature, the temperature of the fuel gas that flows out from the CO eliminator 13, the fuel gas flow volume, and the case temperature of the three-way selector valve 34 are detected. Then the flow proceeds to step S 125, and based on each of the detected values detected in step S 124, it is determined whether or not the warm-up of the CO eliminator 13 has been completed. That is, it is determined whether or not the case temperature of the CO eliminator 13, the CO eliminating catalyst temperature, the fuel gas temperature, the fuel gas flow volume, and the case temperature of the three-way selector valve 34 fall within the set range during idle operation that is set in advance for each of the detected items (below, referred to as the "idle setting range"). If all of these detected values fall within the idle setting range, it is determined that the CO eliminator 13 has completed being warmed up, while if any one of the detected values falls outside of the setting range, it is determined that the warm-up has not completed. In this manner, the completion of the warm-up of the CO eliminator 13 is determined based on a plurality of detected values, and thus the warm-up completion determination can be carried out accurately.

In the case that the determination in step S 125 is negative, the flow returns to step S 123, and the F/B control of the CO eliminating catalyst temperature continues. If the determination in step S 25 is positive, the flow proceeds to step S 126, and the CO eliminator 13 is operated under the idle operation conditions. Then the flow proceeds to step S 127, and it is determined whether or not the reformer 11 has completed warming-up. In the case that the determination in step S 127 is negative, the flow returns to step S 126, and the CO eliminator 13 continues to operation under idle operation conditions.

In addition, in the case that both the reformer 11 and the CO eliminator 13 have completed warming-up, the flow proceeds to step S 128 from step S 120 and step S 127, the CO concentration and THC concentration in the fuel gas flowing out from the CO eliminator are detected, and based on these detected values, it is determined whether or not the fuel gas composition has stabilized. Specifically, in the case that the CO concentration and the THC concentration in the fuel gas is larger that the maximum values set in advance, it is determined that the fuel gas composition has not stabilized, and in the case that they are equal to or lower than the maximum values, it is determined that the fuel gas composition has stabilized.

Moreover, by waiting a predetermined time interval using a timer or the like from the determination that the warm-up of both the reformer 11 and the CO eliminator 13 has completed, it can be determined that the gas composition has stabilized. Thereby, the system structure can be simplified and costs can be reduced.

In the case that the determination in step S 129 is negative, the flow returns to step S 128, and the previous operating state continues, while in the case that the determination in step S 129 is positive, the flow proceeds to step S 130, the three-way selector valve 33 is connected to the fuel gas supply duct 33, the fuel gas flows into the fuel cell stack 21, and the electrical generation is made possible.

Figure 8:
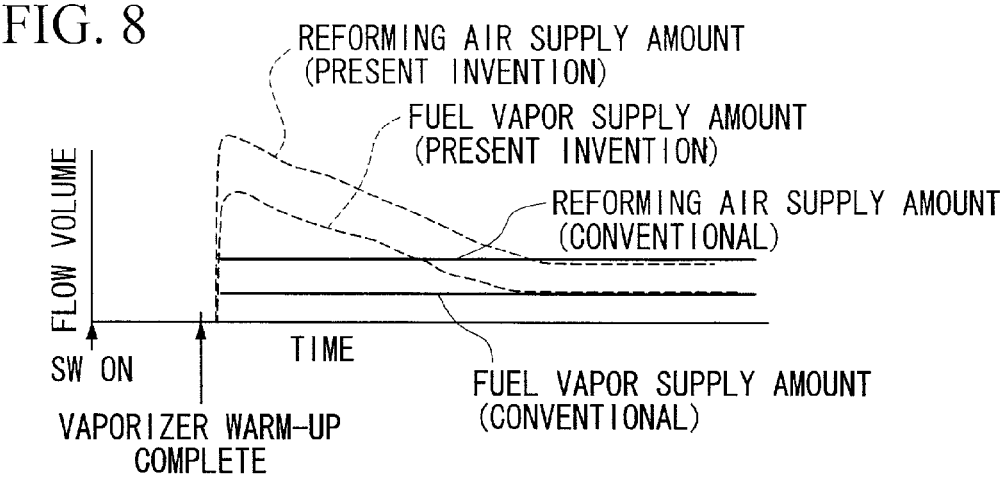
FIG. 8 is a drawing showing the change in the amount of supplied reforming air and the amount of supplied fuel vapor with the passage of time from the beginning of the operation.

FIG. 8 is a drawing that compares the change in the reforming air supply amount and the fuel vapor supply amount with the passage of time beginning when the fuel cell start-up switch is turned ON for the cases of the present invention and the conventional technology. Conventionally, as soon as the warm-up of the vaporizer has completed, the reforming air amount and the fuel vapor amount are the amounts supplied during idle operation after completion of the warm-up, while in the present invention, after completion of the warm-up of the vaporizer, the fuel vapor and the reforming air are supplied in excess compared to the conventional technology, then the amount is gradually decreased accompanying the progress of the warm-up of the reformer 11, and finally they converge on the amounts supplied during idle operation after completion of the warm-up.

Figure 9:
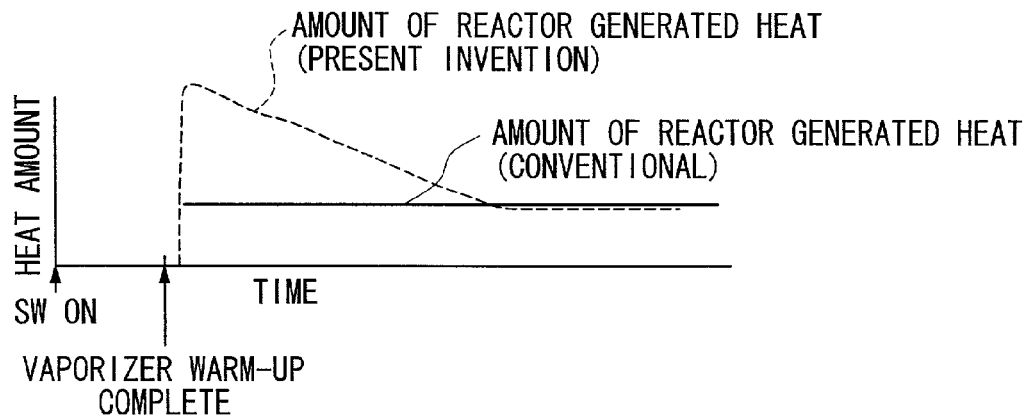
FIG. 9 is a drawing showing the change in the amount of heat generated in the reforming reactor with the passage of time from the beginning of the operation.

FIG. 9 is a drawing comparing the change in the amount of generated heat in the reformer reactor 10 with the passage of time beginning when the fuel cell start-up switch is turned ON for the cases of the present invention and the conventional technology. Conventionally, the amount of generated heat in the reforming reactor is constant from the completion of the warm-up of the vaporizer to the completion of the warm-up of the fuel gas generating apparatus as a whole, while in the present invention, the amount of heat generated in the reforming reactor 10 after completion of the warm-up of the vaporizer is much larger than conventionally, is gradually decreased accompanying the progress of the warm-up of the reforming reactor 10, and finally converges on the amount of generated heat during the idle operation after completion of the warm-up.

Figure 10:
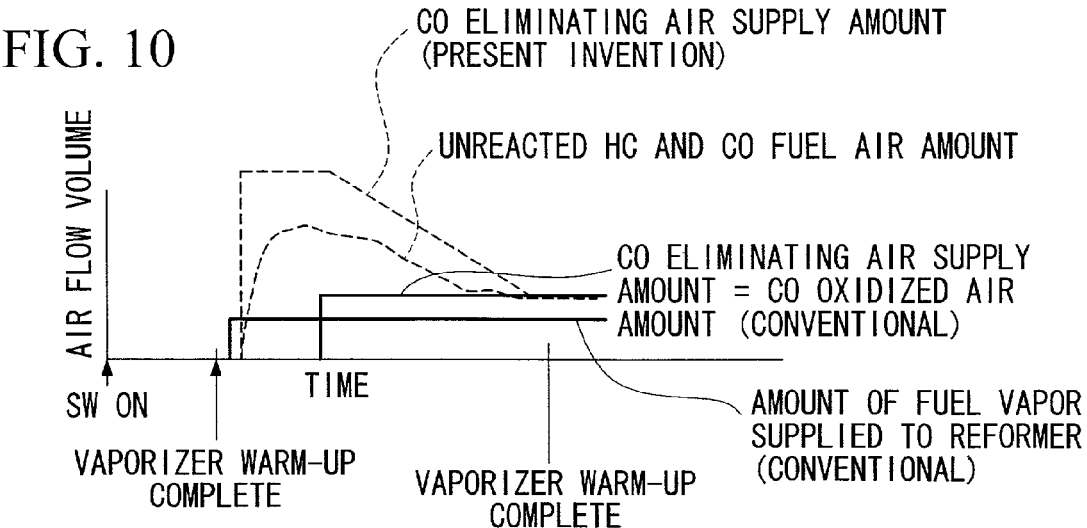
FIG. 10 is a drawing showing the change in the amount of supplied CO eliminating air with the passage of time from the beginning of the operation.

FIG. 10 is a drawing comparing the change in the amount of air for combusting the CO eliminating air supplied amount, the unreacted HC, and the CO with the passage of time beginning when the fuel cell start-up switch is turned ON for the cases of the present invention and the conventional technology. Conventionally, immediately after the completion of the warm-up of the vaporizer, the CO eliminating air amount during idle operation after completion of the warm-up is supplied, while in the present invention, after completion of the warm-up of the vaporizer, CO eliminating air in excess of the conventional technology is supplied, the amount is gradually decreased accompanying the progress of the warm-up of the CO eliminator 13, and finally after completion of the warm-up, converges on the amount supplied during idle operation. The amount of air for combusting the unreacted HC and CO exhibits the same pattern.

Figure 11A:
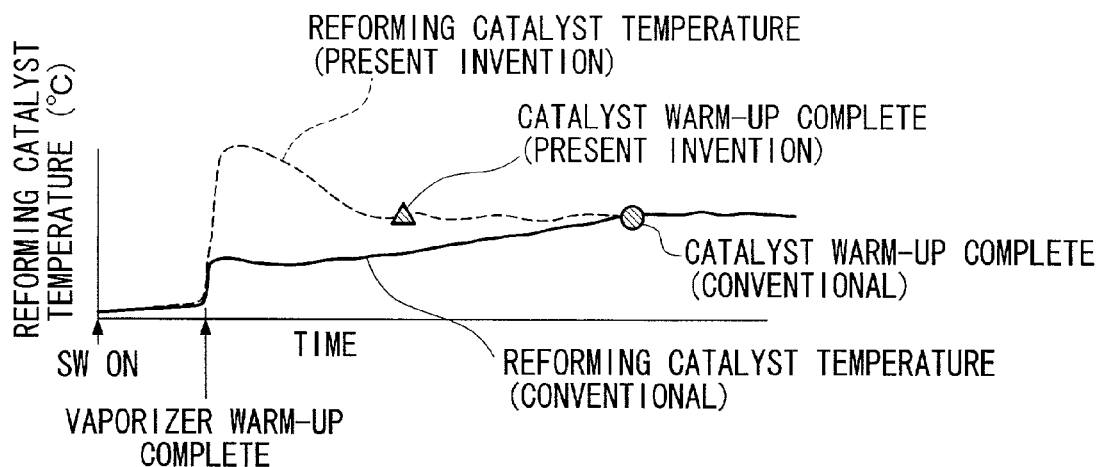
FIGS. 11A to 11D are drawings showing the change in the reforming catalyst temperature, the CO eliminating catalyst temperature, the wall surface temperature, and the CO concentration and THC concentration in the fuel gas with the passage of time from the beginning of the operation.
Figure 11B:
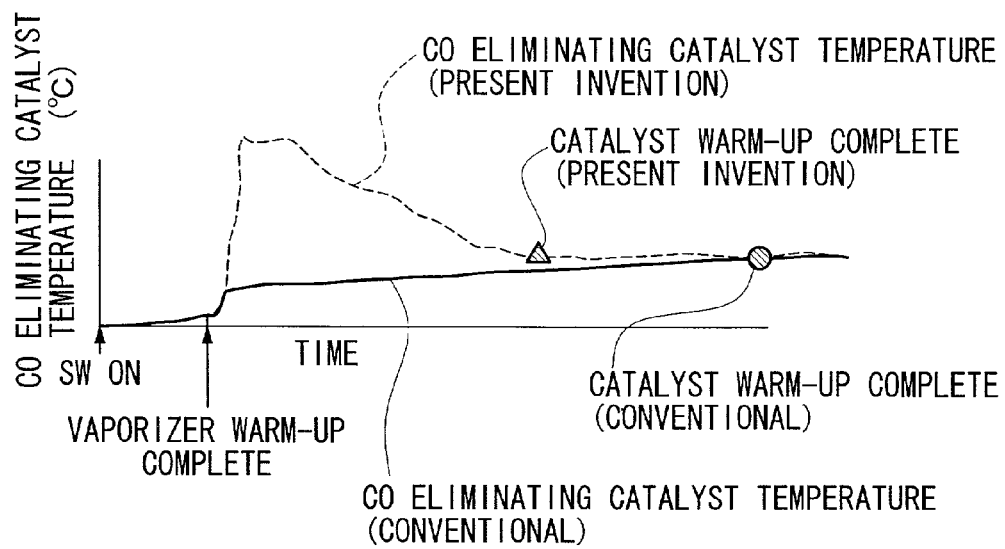
Figure 11C:
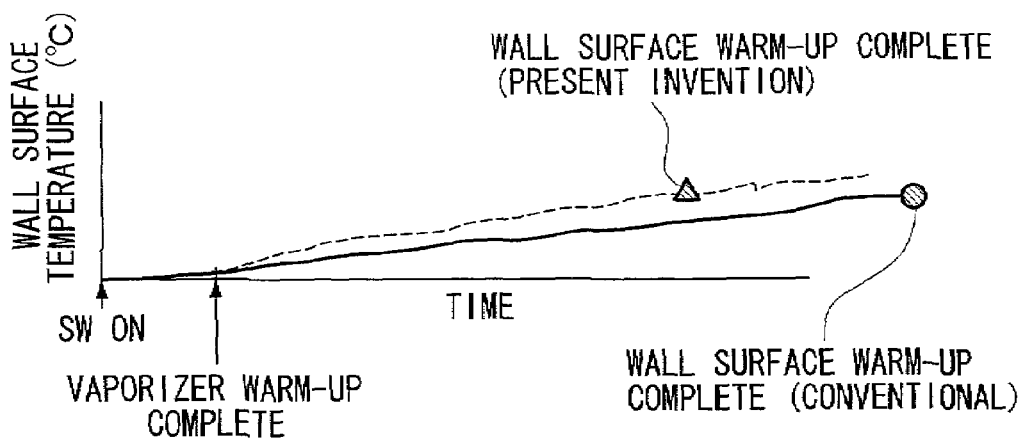
Figure 11D:
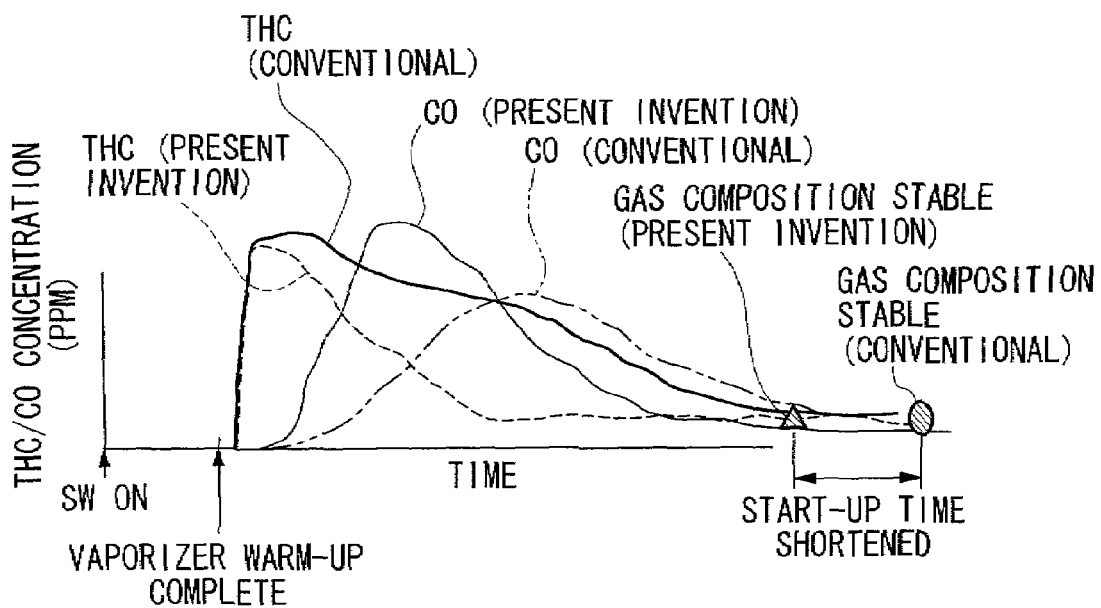

FIG. 11A is a drawing comparing the change in the reforming catalyst temperature with the passage of time beginning when the fuel cell start-up switch is turned ON in the cases of the present invention and the conventional technology, FIG. 11B is a drawing comparing the change in the CO eliminating catalyst temperature with the passage of time beginning when the fuel cell start-up switch is turned ON in the cases of the present invention and the conventional technology, FIG. 11C is a drawing comparing the change in the wall surface temperature of the three-way selector valve 34 with the passage of time beginning when the fuel cell start-up switch is turned ON in the cases of the present invention and the conventional technology, and FIG. 11D is a drawing comparing the change in the CO concentration and THC concentration in the fuel gas with the passage of time beginning when the fuel cell start-up switch is turned ON in the cases of the present invention and the conventional technology.

It is clear from FIG. 11A through FIG. 11D that the warm-up of the reformer 11, the warm-up of the CO eliminator 13, the warm-up of the gas path in the system, and the stabilization of the fuel gas composition occur faster than the conventional technology.

Moreover, in the fuel gas generating apparatus 1 of the present embodiment, compensation of the pressure is carried out when the air amount is calculated, and thus whether the start-up is at a low altitude or a high altitude, the warm-up can be carried out quickly.

In this manner, in this fuel gas generating apparatus 1, the warm up of the reformer 11, the CO eliminator 13, and the system gas path is carried out more quickly than the conventional technology, and in addition, the fuel gas composition is stabilized more quickly than the conventional technology. Therefore, the time taken from the start of the operation of the fuel cell stack 21 until power generation becomes possible can be shortened.

Moreover, in the embodiment described above, the reduction control of the CO eliminating air amount was carried out using F/B control, but this type of control method is not limiting. For example, control can be carried out such that the CO eliminating air amount is reduced at a constant slope over a predetermined time interval. In this case, when the CO eliminating air attains the amount supplied during idle operation, the reduction control is stopped. Thereby, the control can be simplified, and at the same time, because the reduction control can be stopped at the critical CO eliminating air amount for CO elimination, more accurate control becomes possible.

In the embodiment described above, the idle operation serves as the minimum operational state for maintaining the temperature of the fuel gas generating apparatus, but there is also case in which the idle operation is the minimum operational state for operating the fuel cell, the case in which it is the minimum operational state for maintaining the temperature of the reformer, and the case in which it is the minimum operational state for maintaining the temperature by the CO eliminator.

As explained above, according to a first aspect of the present invention, during warm-up oxygen in the air that is supplied in excess to the reformer is combusted by a catalyst inside the reformer, the reformer and the reforming gas are heated, and thus the quick warm-up of the reformer becomes possible. Furthermore, the CO eliminator and the gas path in the system are heated by the heated reforming gas flowing downstream, and thus the quick warm-up of the CO eliminator and the system gas path becomes possible. As a result, there are the superior effects that the fuel gas composition can be quickly stabilized, and also quick power generation by the fuel cell becomes possible.

According to a second aspect of the present invention, during warm-up, the amount of heat generation in the reformer is increased further, and thus the warm-up of the reformer speeds up, and at the same time the amounts of hydrogen, CO, and unreacted hydrocarbons flowing from the reformer during the warm-up is increased, and thus there are the effects that the amount of heat generation in the CO eliminator also increases, and the warm-up of the CO eliminator also speeds up.

According to a third aspect of the present invention, the amount of oxygen that allows combustion by the catalyst in the reformer can be guaranteed, and thus there are the effects of a quick warm-up due to increasing the supplied amount of raw liquid fuel and a quick warm-up due to increasing the supplied amount of the reforming air.

According to a fourth aspect of the present invention, the overheating of the catalyst in the reformer can be prevented, and thus the deterioration of the catalyst due to overheating can be prevented.

According to the fifth aspect of the present invention, the warm-up state of the reformer can be gradually stabilized, and thus the reformer can be reliably guided to the completion of the warm-up.

According to the sixth and seventh aspects of the present invention, when the reformer has been warmed-up as required, the supplied amount of reforming air that has been increased by compensation can be controlled so as to be reduced, the overheating of the catalyst in the reformer can be reliably prevented, and thus the deterioration of the catalyst due to overheating can be prevented.

According to a eighth aspect of the present invention, during warm-up, the hydrogen, the carbon monoxide, and the unreacted hydrocarbons flowing out from the reformer can be sufficiently combusted by the catalyst in the CO eliminator, along with the oxygen in the CO eliminating air that is supplied in excess, and due to this combustion heat, the CO eliminator can be heated. Furthermore, the gas path in the system can be heated due to this combustion gas flowing downstream, and thus the quick warm-up of the system gas path becomes possible. As a result, there are the effects that the fuel gas composition can be quickly stabilized and that the quick power generation by the fuel cell becomes possible.

According to an ninth aspect of the present invention, a fuel gas that has been controlled so as to obtain a predetermined gas composition and gas temperature can be supplied to the fuel cell, and thus the power generating state of the fuel cell can be stabilized.

What is claimed is:

1. A fuel gas generating apparatus for a fuel cell comprising:
   a vaporizer that generates a fuel vapor by vaporizing a raw liquid fuel;
   a reformer that generates a reforming gas that includes hydrogen from the raw fuel gas that has been partially oxidized by adding reforming air to the fuel vapor generated by said vaporizer;
   a CO eliminator that generates a fuel gas having carbon monoxide eliminated by adding a CO eliminating air to said reforming gas generated by said reformer; and
   a reforming air amount control device that controls the supplied amount of said reforming air during the warm-up of said reformer so as to become larger than the supplied amount of reforming air during the idle operation after completion of the warm-up, said reforming air amount control device further controlling the supplied amount of said reforming air so as to decrease the supplied amount which was increased by said reforming air amount control device during said warm-up of said reformer when the temperature of said reformer is higher than a first predetermined temperature which is determined by the regenerating temperature of a reforming catalyst in said reformer.

2. A fuel gas generating apparatus for a fuel cell according to claim 1 comprising a fuel amount control device that controls the supplied amount of said raw liquid fuel during said warm-up of said reformer so as to become larger than the supplied amount of raw liquid fuel during idle operation after completion of the warm-up, said fuel amount control device further controlling the supplied amount of said raw liquid fuel so as to decrease the supplied amount which was increased by said fuel amount control device during said warm-up of said reformer when said temperature of said reformer is higher than said first predetermined temperature.

3. A fuel gas generating apparatus for a fuel cell according to claim 2 wherein the ratio of the increased supplied amount of reformed air controlled by said reforming air amount control device is set larger than the ratio of the increased supplied amount of raw liquid fuel controlled by said fuel amount control device.

4. A fuel gas generating apparatus for a fuel cell according to claim 1 wherein the control for decreasing the supplied amount of said reforming air cavses the supplied amount of said reforming air to decrease such that the temperature of said reformer becomes a second predetermined temperature lower than said first predetermined temperature.

5. A fuel gas generating apparatus for a fuel cell comprising:
   a vaporizer that generates a fuel vapor by vaporizing a raw liquid fuel;
   a reformer that generates a reforming gas that includes hydrogen from the raw fuel gas that has been partially oxidized by adding reforming air to the fuel vapor generated by said vaporizer;
   a CO eliminator that generates a fuel gas having carbon monoxide eliminated by adding a CO eliminating air to said reforming gas generated by said reformer; and
   a CO elimination air amount control device that controls the supplied amount of said CO eliminating air during the warm-up of said CO eliminator so as to become larger than the supplied amount of CO eliminating air during the idle operation after completion of the warm-up, said CO elimination air amount control device further controlling the supplied amount of said CO eliminating air so as to decrease the supplied amount which was increased by said CO elimination air amount control device during said warm-up of said CO eliminator when the temperature of said CO eliminator is higher than a third predetermined temperature which is determined by the regenerating temperature of a CO eliminating catalyst in said CO eliminator.

6. A fuel gas generating apparatus for a fuel cell according to claim 1 wherein said reformer and CO eliminator supply the fuel gas to the fuel cell after it has been determined that the warm-up has completed.

7. A fuel gas generating apparatus for a fuel cell according to claim 1 wherein said reformer and CO eliminator supply the fuel gas to the fuel cell after it has been determined that the warm-up has completed.

8. A fuel gas generating apparatus for a fuel cell according to claim 1 wherein the reforming catalyst of the reformer is a palladium-type precious metal catalyst.

9. A fuel gas generating apparatus for a fuel cell according to claim 2, wherein the control for decreasing the supplied amount of said raw liquid fuel causes the supplied amount of said raw liquid fuel to decrease such that the temperature of said reformer becomes a second predetermined temperature lower than said first predetermined temperature.

10. A fuel gas generating apparatus for a fuel cell according to claim 5, wherein the control for decreasing the supplied amount of said CO eliminating air causes the supplied amount of said CO eliminating air to decrease such that the temperature of said CO eliminator becomes a fourth predetermined temperature lower than said third predetermined temperature.

* * * * *